Figure 1:
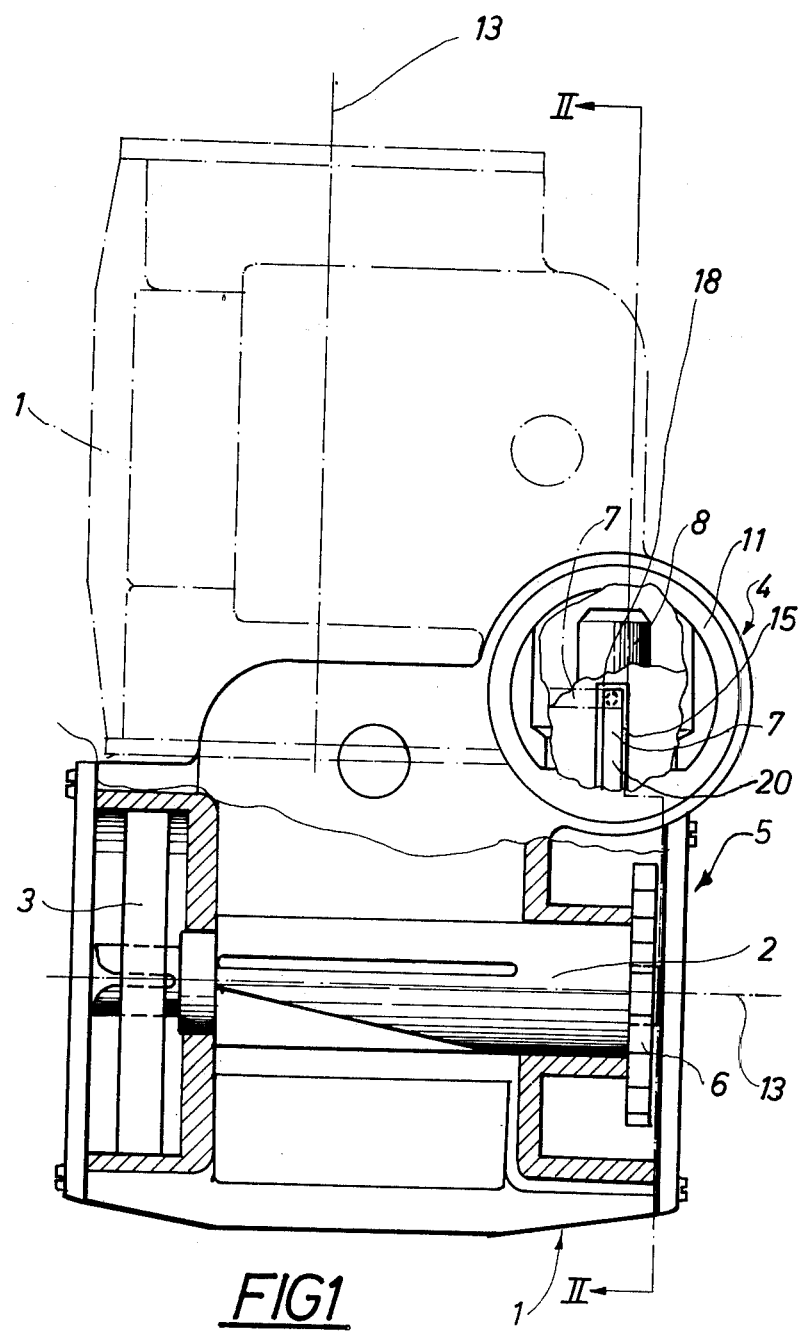

United States Patent [19]

Lindblad

[11] 4,193,564
[45] Mar. 18, 1980

[54] LOCKING DEVICE IN CONNECTION WITH SAFETY BELTS

[76] Inventor: Stig M. Lindblad, Stockabo, S-44020 Vargarda, Sweden

[21] Appl. No.: 903,654

[22] Filed: May 8, 1978

[51] Int. Cl.² .................. A62B 35/02; B65H 75/48
[52] U.S. Cl. ............................................ 242/107.4 A
[58] Field of Search ............ 242/107.4 A; 297/388; 280/744–747

[56] References Cited

U.S. PATENT DOCUMENTS

| | | | |
|---|---|---|---|
| 3,868,068 | 2/1975 | Heath | 242/107.4 A |
| 3,923,269 | 12/1975 | Keil | 242/107.4 A |
| 4,063,695 | 12/1977 | Oshikawa | 242/107.4 A |
| 4,077,584 | 3/1978 | Lafont | 242/107.4 A |
| 4,087,059 | 5/1978 | Lindblad | 242/107.4 A |

Primary Examiner—John M. Jillions

[57] ABSTRACT

A safety belt retractor for vehicles with a locking device arranged to lock upon an acceleration of the vehicle. This acceleration is sensed by an activating means convertible between an inactive and an activated condition in which the retractor is locked by means of a pawl engaging a ratchet wheel. The activating means can be mounted in different angular positions around a pivot axis relative to the housing of the retractor. The activating means includes a transmission element for the transmission of the different conditions to the pawl. The transmission element has a guiding surface located in connection with said pivot axis. The pawl bears by means of a portion against said guiding surface, which is displaceable transversely to said pivot axis in dependence on the condition of the activating means.

5 Claims, 6 Drawing Figures

LOCKING DEVICE IN CONNECTION WITH SAFETY BELTS

The present invention relates to a locking device in connection with safety belts of the reel belt type, preferably intended for use in vehicles and equipped with a band, which against the bias of spring means can be unwound from a rotating band reel, comprising a ratchet wheel or similar normally rotating together with the reel and a ratchet mechanism arranged to co-operate with the ratchet wheel and provided with a pawl, which can be switched between a releasing position, in which it releases the ratchet wheel, and a locking position, in which it engages the ratchet wheel in order to prevent the rotation of the same in one direction, and an activating means, which is arranged for one thing to occupy an activated condition and for another thing to occupy an inactive condition and depending upon its condition to actuate the ratchet mechanism in order to effectuate its switching movement between its releasing and its locking positions, and which substantially comprises for one thing a body of inetia, which is arranged under the influence of forces of inertia to be switched from an inactive position into an activated position, and for another thing a transmission mechanism, which is arranged to sense the position of the body of inertia and depending thereupon to actuate the pawl, the setting of the actuating means being chosen between different angular positions relative to a pivot axis, and the transmission mechanism being arranged to transmit the switching movement of the body of inertia to the pawl substantially independent of the setting of the angular position of the activating.

As the forces operating upon the body of inertia have to be taken into consideration, said body and the surface of the same limiting its movements must normally be in a certain relation to the vertical line. The installation of such reel type locks can therefore not be made at liberty with respect to their positioning.

By German Offenlegungsschrift No. 2557460 a device is known, in which the activating means with the body of inertia enclosed in the same has been made pivotable relative to the housing of the band reel. By means of this arrangement a great freedom of choice with respect to the installation of the reel type lock is obtained. However, the mechanism of transmission forming part of the activating means and transmitting the movement between the body of inertia and the pawl of the reel type lock is to a certain extent limited with respect to its functional possibilities. In the known device mentioned the transmitted movement is dependent on certain outer dimensional conditions, such as the position of the pivotable part and its distance in relation to the ratchet mechanism forming part of the assembly. Said dimensions cannot simply be changed, but desired relation of forces, displacing movements, and desired speed can only be satisfied to a certain extent by a suitable location of pivoting axles and a suitable choice of length of the lever arms forming part of the assembly.

The object of the present invention is to eliminate the above disadvantage by means of a device, which is a transmission element forming part of the transmission mechanism, which element is provided with a guiding surface located in connection with said pivot axis, which guiding surface is arranged to displace itself in a direction of displacement substantially transversely to said pivot axis and relative to a portion of the ratchet mechanism bearing against the guiding surface, through which portion the pivot axis extends, said guiding surface being shaped in such a way that in connection with the displacement of the guiding surface the contact surface of said portion against the guiding surface is displaced in substantially axial direction, whereby a movement of the ratchet mechanism is brought about in order to switch over the pawl.

Figure 2:
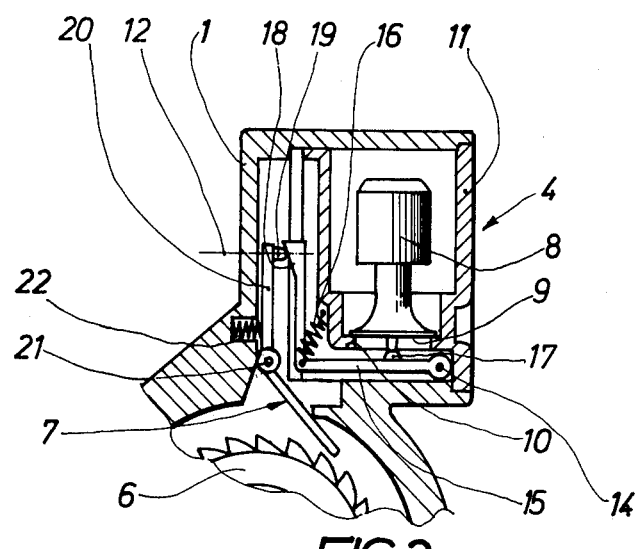
Figure 3:
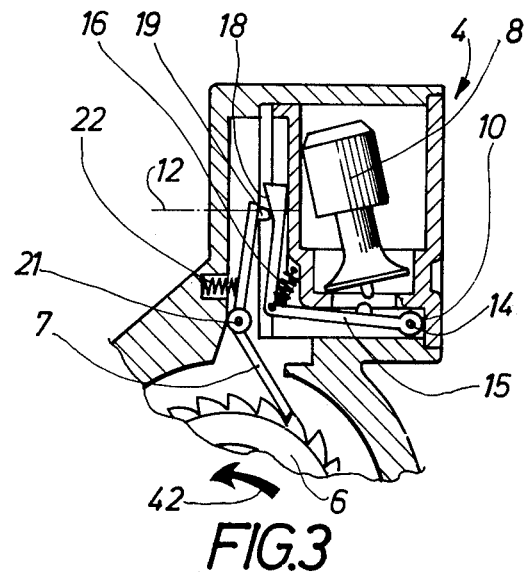

The invention will now be described in the following more in detail by means of a few examples of embodiment, reference being made to the accompanying drawings, in which FIG. 1 is a partly broken view of a reel type lock according to the invention in two different positions of mounting, FIG. 2 is a partly broken cross sectional view along the line II—II in FIG. 1 showing a locking device according to the invention in a first embodiment in inactive condition, while FIG. 3 is a corresponding view showing the locking device in active condition.

Figure 4:
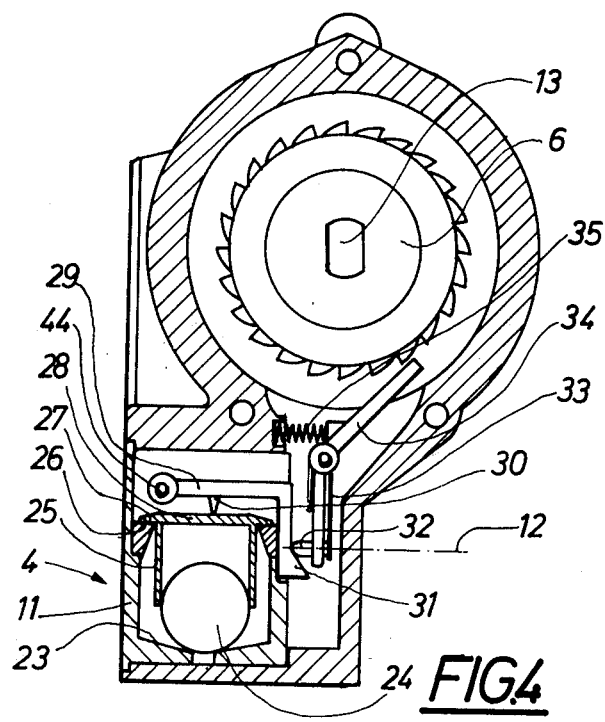
Figure 5:
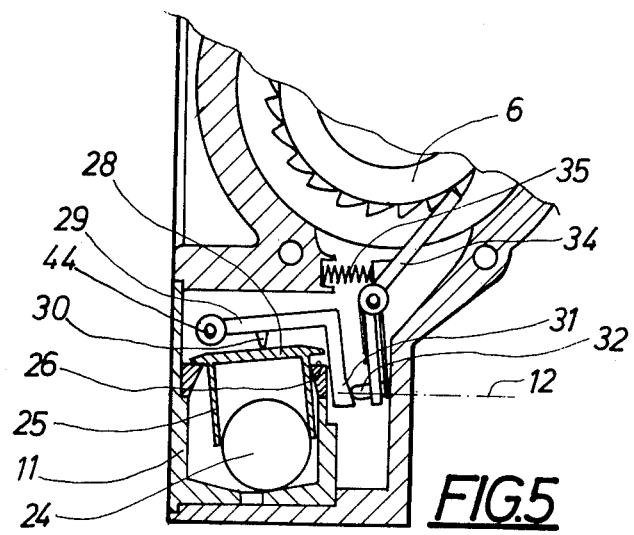

FIG. 4 and 5 in a corresponding manner illustrate the locking device according to the invention in a second embodiment inactive and activated condition respectively.

Figure 6:
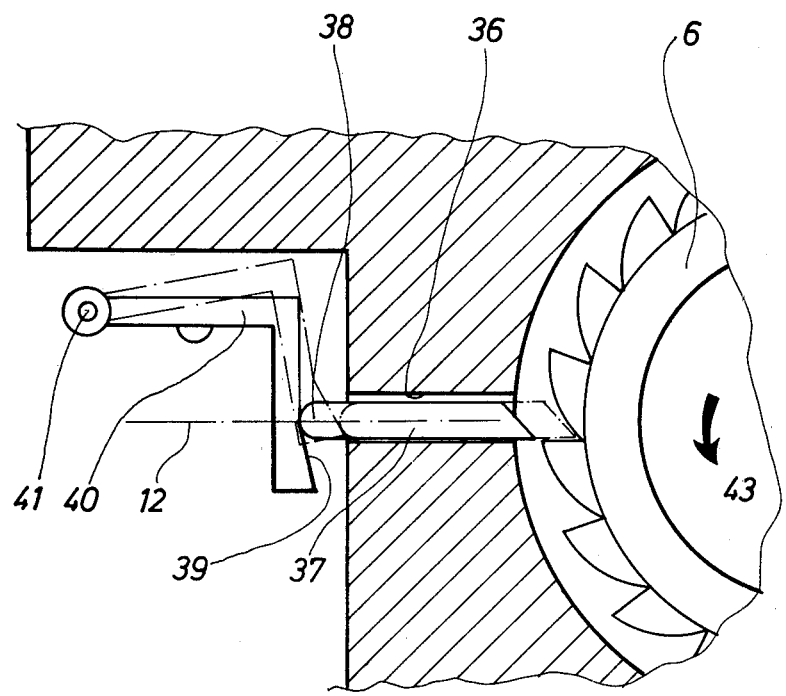

FIG. 6 is a schematic view of a part of the locking device according to the invention in a third embodiment.

The fundamental idea according to the present invention makes possible a dimensioning of the elements forming part of the locking device substantially independent of outer dimensional conditions, to which the locking device is generally limited by several factors, which are not related to the pure locking function. The dimensioning of the locking device according to the invention because thereof can be chosen in such a manner that optimum characteristics are obtained with respect to its function, such as suitable deflections of the pawl forming part of the locking device, suitable speed and sensitivity etc. This has been made possible to providing a guiding surface, which can be displaced substantially crosswise to the pivoting axis, around which the activating device pivots, the design of the guiding surface substantially being the decisive factor for the characteristics of the movements of the pawl.

As is evident from FIG. 1, a safety belt retractor, in which the locking device according to the invention can find an advantageous application, is composed of a band reel 2 pivotally journalled in a housing 1, on which reel the band of the safety belt (not shown) can be wound up under the action of a spring 3, which with one end is connected to the housing and with the other end is connected to one end of the band reel. At the other end of the band reel 2 a locking device according to the inventions is provided, which locking device substantially comprises an activating means 4 and a ratchet mechanism 5. A ratchet wheel 6 of said ratchet mechanism 5 is illustrated in FIG. 1. The ratchet wheel is arranged to rotate together with the band reel 2 and under the influence of the activating means 4 to be brought to lock the reel under certain circumstances. For clarity's sake the ratchet mechanism is very schematically shown by means of a simple embodiment, in which the ratchet wheel 6 is rigidly connected with the band reel 2. However, in connection with such a design the pawl 7 forming part of the ratchet mechanism must take up the load acting upon the band of the belt and therefore the ratchet mechanism is usually in practice designed so, that the shown mechanism is arranged to initiate a second mechanism, which is arranged to receive the loads on the band. Such a mechanism can by way of example be designed in such a manner that it is triggered also by the forces of acceleration appearing in connection with a rapid unwinding of the band of the belt. However, a description more in detail of such a mechanism has for clarity's sake been omitted in the present application, as it cannot be considered to be necessary for the description of the function and principal design of the present invention.

As is evident from the embodiment of the locking device according to the invention illustrated in the FIGS. 2 and 3, the activating means 4 is substantially composed by a body 8 of inertia, which in the present example comprises an upright pendulum and a mechanism of transmission, which is in contact for one thing with the body of inertia and for another thing with the pawl 7. The body 8 of inertia is in FIG. 2 illustrated in its inactive condition, in which it rests with its underside 9 against a support 10 in a housing 11, which is in principle according to free choice insertable or adjustable in alternative angular positions relative to the housing 1 of the reel type lock around a pivot axis 12, which extends in substantially transverse direction to the axes 13 of rotation of the band reel 2 (see FIG. 1). A transmission element 15 forming part of the transmission mechanism is pivoted around an axis 14 in the housing 11. In said mechanism also a spring 16 forms part of the assembly, in the example illustrated being a tension spring, which tends to maintain the transmission element 15 in the position shown in FIG. 3. Its spring force is adjusted to the effect that said force is overcome by the weight of the body 8 of inertia, which by contact with a sensor device 17 contributes to maintaining the element in the position mentioned.

The transmission element 15 in the illustrated example comprises a bell crank, the free end of which according to the invention is provided with a guiding surface 18, which because of the fact that the bell crak can pivot round its axis 14, is movable for a distance in a direction substantially transverse to the pivoting axis 12 of the activating means 4. A portion 19 of the pawl 7 bears against the guiding surface 18, which occupies an oblique position in a carefully adjusted angular setting relative to a radial plane through said pivoting axis 12. Said portion 19 is located at the free end of a sensing arm 20 forming part of the pawl 7 which in the illustrated example of embodiment comprising a two-armed lever, which is pivotable round a shaft 21. Said portion 19 of the pawl is under the bias of a pressure spring 22 kept in close contact with the guiding surface 18. As is evident from FIG. 2 the pawl then is in its releasing position, so that the ratchet wheel 6 can rotate freely in both directions of rotation.

In the embodiment of the locking device according to the invention illustrated in the FIGS. 4 and 5, the body of inertia comprises a ball 24 supported by a cup-shaped support 23. The ball 24 is in contact with a tube-shaped portion 25. This tube-shaped portion rests on an upper plane 26 of annular shape by means of a flange 27, which projects from a cover part 28. The transmission element 29, pivoted around its pivot axis 44 in the housing 11 bears with its sensing portion 30 against the cover part 28 and exhibits the oblique guiding surface 31, against which a portion 32 of the ratchet mechanism is bearing. Said ratchet mechanism is in this example of embodiment provided with a feeler of a spring yielding type, which means that the sensing portion 32 via a plate spring 33 can spring relative to the other portion of the pawl 34 in such a manner that said pawl can pass above the toothing of the ratchet wheel 6 during its rotation against the locking direction without it being necessary that the activating means 4 follows in this movement. A pressure spring 35 maintains the pawl in the releasing position shown in FIG. 4. As was the case with the preceding embodiment the mounting of the activating means 4 can be chosen between different angular positions around a pivot axis 12 the guiding surface 31 as well as the sensing portion 32 always being located in connection with said pivot axis.

In the FIG. 6 a third embodiment is quite schematically shown, the ratchet mechanism in the same being designed with a pawl 37 which can be displaced in its longitudinal extension in a groove 36, one end 38 of said pawl being in contact with the oblique guiding surface 39 of the transmission element 40. For clarity's sake the remaining portion of the activating means is not shown here, but it can for example be of the type shown in the FIGS. 4 and 5. Also in this example of embodiment the activating means and consequently also the transmission element 40 with its pivot axis 41 is provided to be mounted in one among suitable chosen angular positions relative to the pivot axis 12 and consequently relative to the other part of the reel type lock.

In connection with normal changes of speed of a vehicle, in which the reel type lock according to the invention is mounted, the activating means is in inactive position and the ratchet mechanism is releasing position. However, when an unnormal change of speed of the vehicle occurs, the following takes place. In the embodiment according to the FIGS. 2 and 3 the upright pendulum 8 tilts over on its support 10 whereby the load exercised by the pendulum on the transmission element ceases, and said element under the bias of the spring 16 is pivoted into the position shown in FIG. 3. Now a displacement of the free end of the transmission element 15 takes place with the guiding surface substantially transverse to the pivot axis 12 for the activating means 4, which results in that the contact surface between the portion 19 of the pawl 7 and the transmission element 15 displaces itself for one thing along the guiding surface and for another thing relative to the axis 21 of the pawl 7. By the oblique position of the guiding surface a pivoting of the pawl around its axis 21 under the bias of the spring 22 takes place, whereby the pawl is switched over into a locking position engaging the toothing of the ratchet wheel 6. Thus, the ratchet wheel can be locked against rotation in the direction of the arrow 42, which results in a locking of the reel type lock against unwinding of the band of the safety belt.

In a corresponding manner the locking device is returned to a releasing position, when the unnormal change of speed of the vehicle has ceased, which takes place by the pendulum 8 occupying its inactive position, whereby the transmission element 15 is pressed down by the weight of the body of inertia and the guiding surface 18 displaces itself in downwards direction. By the inclination of the guiding surface 18 and the passage of said contact surface the moving aside of the sensing portion 19 is made possible, so that the pawl 7 is switched over into the releasing position illustrated in FIG. 2.

In connection with an unnormal change of speed of the vehicle the ball 24 in the embodiment according to the FIGS. 4 and 5 in a corresponding manner rolls from its inactive position shown in FIG. 4 to the position shown in FIG. 5, whereby the tubular portion 25 tilts over on its support 26. Now the cover part 28 is raised right in front of the sensing organ 30 of the element 29, which is brought to pivot round its pivot axis 44 into the position shown in FIG. 5. This results in a displacement of the guiding surface 31 substantially in a direction transverse to the pivot axis 12 and brings about a displacement of the sensing portion 32 of the pawl 34. The magnitude of the displacement substantially concerns only the inclination of the guiding surface 31 and its path of displacement. Provided that the pawl without obstruction can engage the toothing of the ratchet wheel 6, the pawl now against bias of the spring 35 pivots into a locking position.

When according to FIG. 4 the body of inertia 24 occupies its inactive position, the tubular portion 25 is reset from its tilted position, whereby the cover portion 28 is pivoted downwards into a position, in which it completely rests upon its support 26. In this connection the transmission element 29 is pivoted downwards and consequently also the guiding surface 31 is displaced substantially into a position transversly to the pivot axis 12, whereby the sensing portion 32 slides along the guiding surface 31, and the pawl 34 under bias of the spring 35 pivots into the releasing position illustrated in FIG. 4.

In the embodiment illustrated in FIG. 6 the transmission element 40 in correspondence to the examples previously described is brought to pivot round its axis 4 when activated by a body of inertia and in such connection occupies the position indicated with dashed and dotted lines, whereby the guiding surface is displaced in such a manner that the pawl 37 is displaced in its groove 36 and engages the toothing of the ratchet wheel in order to lock the same.

When in the embodiment according to FIG. 6 the activated condition ceases, the transmission element 40 pivots down to the position shown with continuous lines, whereby a possibility is given to the pawl 37 to be reset to its releasing position, which is carried out by means of the toothing, as soon as the ratchet wheel is rotated in a direction contrary to the locking direction, i.e. in the direction of the arrow. The return of the pawl 37 can also take place by means of a return spring not shown.

In FIG. 1 it is shown how the retractor can be mounted in different alternative angular positions by the activating means 4 being designed to permit its occupying different angular positions relative to the housing 1 of the retractor. With dashed and dotted lines an alternative mounting position relative to the position indicated with continous lines has been hinted, which position is made possible by giving the activating means a corresponding deviation with respect to the angular position, in this case being a quarter of a full turn. Thus, the body of inertia 8 and the housing 1 in inactive condition normally occupy an unchanged position relative to a reference plane of a vehicle. The transmission element 15 and the guiding surface 18 go with the housing 11 of the activating means, while the pawl 7 and its feeler arm 20 go with the housing 1 of the retractor and it is evident from the function of the invention that the transmission of the mevement of the body of inertia always takes place in the same manner irrespective of the angular position of the activating means 4 relative to the housing 1 of the retractor, because the guiding surface 18 is located in connection with the pivot axis 12 and performs a movement directed substantially transversly relative to this axis. By this design alternative mountings of the retractor in a vehicle are made possible with the axis 13 of rotation of the band reel positioned in an angle of inclination said angle depending upon the actual mounting (by way of example upright, inclined or lying), the activating means in that connection being mounted in a predetermined angular position so that the support for the body of inertia is not inclined relative to the horizontal plane.

The invention is not limited to the examples of embodiment described above and illustrated in the drawings, but can be varied within the scope of the following claims. Even if it has not been shown in the foregoing, it is obvious that the activating means can be designed in such a way that it can be set and function in any angular position relative to the housing of the retractor. This can take place either by the activating means 4 being freely pivotable relative to said housing or by said activating means being designed in such a manner that certain predetermined calibrated angular positions can be occupied, by way of example by means of guide pins or similar. In practice a predetermined angular position of two or several alternative positions will in this connection be chosen according to the desired position of installation in a vehicle of a certain type, already when the assembly is made in the factory. The design of the guiding surface can be made in many different ways and be chosen according to the characteristics of movement, which one desires for the pawl. By way of example it is not necessary that the guiding surface is completely plane, as curved guiding surfaces also can be imagined.

I claim:

1. A locking device for a safety belt retractor for use in vehicles and comprising a band reel rotatably journalled in a housing, a band connected with one end to the band reel, spring means arranged to wind up the band on the band reel, a ratchet wheel rotatable together with the band reel, a pawl arranged to be movable between a releasing position and a locking position to release and lock the ratchet wheel, respectively, activating means comprising a body of inertia, arranged to move between an inactive position and an activated position, and a transmission mechanism connected to the body of inertia and to the pawl, a housing portion for supporting the body of inertia and the transmission mechanism, said housing portion being mounted in said housing in one chosen position among different alternative angular positions relative to a pivot axis extending transversely to the rotating axis of the band reel, the transmission mechanism including a transmission element which is pivotally journalled in the housing portion and provided with a guiding surface which is inclined relative to a radial plane through said pivot axis of the housing portion and provided with a contact surface by means of which the guiding surface is in contact with a portion of the pawl, said portion of the pawl being movable in the direction of said pivot axis thereby moving the pawl, the transmission element being movable between two positions under the influence of the body of inertia with the guiding surface movable substantially transversely to said pivot axis, whereby said contact surface moves along said guiding surface and said portion of the pawl is displaced substantially in the direction of the pivot axis resulting in said pawl being moved between locked and released positions respectively.

2. A device according to claim 1, wherein said guiding surface is substantially plane.

3. A device according to claim 1 wherein said transmission element comprises a lever arm pivotally journalled on a swivel axis extending substantially transversely to said pivot axis, which lever arm is provided with said guiding surface located at a chosen distance from said swivel axis, and which is arranged to sense the condition of the body of inertia and depending thereupon to pivot between two pivoting positions in order to displace the guiding surface.

4. A device according to claim 3 wherein the transmission element comprises a one-armed bell crank, which is arranged at a chosen distance from its swivel axis to be actuated by the body of inertia.

5. A device according to claim 1, wherein the transmission element is arranged to be maintained in an inactive position by the influence of the gravity force of the body of inertia and to be moved into an activated position by said gravity force being brought to cease upon movement of the body of inertia to its activated position.

* * * * *